May 20, 1924.
M. I. PUPIN
ELECTRICAL TUNING
Filed Sept. 17, 1915
1,494,803
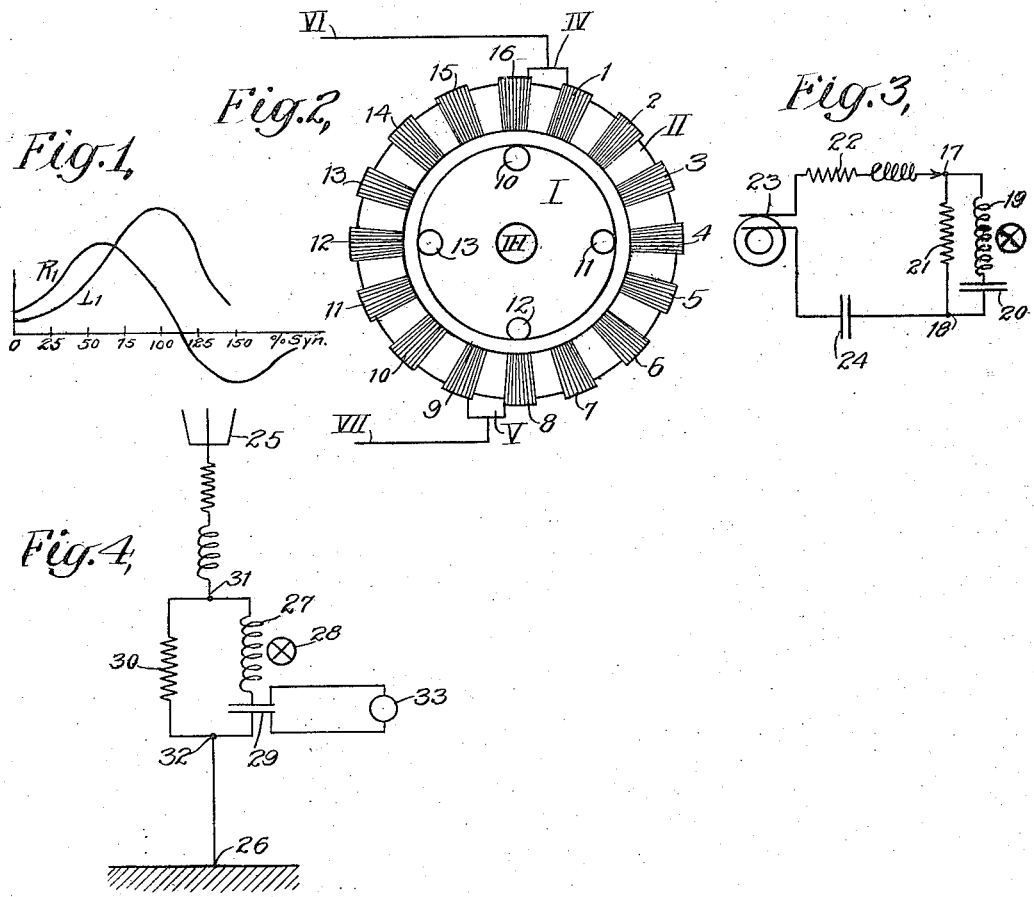

Patented May 20, 1924.

1,494,803

UNITED STATES PATENT OFFICE.

MICHAEL I. PUPIN, OF NORFOLK, CONNECTICUT, ASSIGNOR TO WESTINGHOUSE ELECTRIC AND MANUFACTURING COMPANY, OF EAST PITTSBURGH, PENNSYLVANIA, A CORPORATION OF PENNSYLVANIA.

ELECTRICAL TUNING.

Application filed September 17, 1915. Serial No. 51,150.

*To all whom it may concern:*

Be it known that I, MICHAEL I. PUPIN, a citizen of the United States, residing in Norfolk, county of Litchfield, State of Connecticut, have invented certain new and useful Improvements in Electrical Tuning; and I do hereby declare the following to be a full, clear, and exact description of the invention, such as will enable others skilled in the art to which it appertains to make and use the same.

The object of the present invention is to provide methods of and apparatus for electrical tuning by means of which the electrical resistance reaction which a conductor opposes to a simple harmonic electromotive force is rendered selective, that is to say, the conductor opposes a resistance reaction as small as desirable to an electromotive force of a given frequency, while at the same time this reaction may be made as large as desirable to an electromotive force of a different frequency or to electrical pulses.

The means by which this is accomplished is called in this specification "a resistance compensator," a description of which will now be given.

A brief statement of the theory of action of a particular form of resistance compensator is this. Consider the primary or, as it is usually called, the stator winding of a single phase induction motor. It reacts against an impressed simple harmonic electromotive force with a definite simple harmonic reaction, which is equal to the difference of potential between its terminals. This being decomposed into two components, one in phase with the current and the other at right angles to it, will show that the primary or stator reaction consists of a resistance reaction and an inductance reaction, or in other words that the stator winding through its mutual induction with the rotor circuits has a definite effective resistance and a definite effective reactance. It is clear that these can be determined experimentally in a Wheatstone bridge employing an electromotive force of the frequency under consideration. I have performed these measurements and I have found that theory and experiment agree.

Referring to the diagrams of the drawings, which form a part of this specification:

Fig. 1 is a diagram representing a curve which expresses the relation between the effective inductance and resistance of the primary winding of a single phase induction motor and the ratio of the speed-frequency of the rotor to that of the impressed electromotive force.

Fig. 2 is a diagram representing the most essential parts of the structure of a single phase induction motor.

Fig. 3 is a diagram representing a method of modifying the reactions which a single phase induction motor presents to an impressed simple harmonic electromotive force.

Fig. 4 is a diagram representing the insertion of a single phase induction motor into a wireless antenna for the purpose of modifying its electrical reactions to an impressed periodically varying electromotive force.

Referring now to diagram of Figure 1, the abscissæ represent the ratio between the electrical angular velocity $\bar{\omega}$ of the rotor of a single phase induction motor and the frequency-speed ($p$) of the electromotive force impressed upon its stator winding (this ratio being multiplied by a hundred) whereas the ordinates for the curves denoted by $L_1$ and $R_1$ represent the corresponding effective inductance $L_1$ and the effective resistance $R_1$, respectively. It is seen from these curves that $R_1$ becomes negative beyond synchronous speed, that is after $\bar{\omega}$ has become greater than $p$.

In order to show how this resistance $R_1$ depends upon the construction of the induction motor reference is made here to diagram of Figure 2.

In this diagram I and II are iron cores made up of sufficiently thin iron plates. Coils 1, 2, 3, 4 . . . . 16, all connected in series, are symmetrically distributed over the iron core II (the stator core), and then tapped at IV and V, dividing the whole winding into two equal halves. The two halves work in parallel with respect to an electromotive force impressed between VI and VII. They are the primary winding of a two-pole induction motor. The iron core I which rotates on shaft III, hence called the rotor core, carries four equal copper bars 10, 11, 12 and 13, which are connected in parallel by conductive side plates. These bars must be distributed over the core as symmetrically as possible. Bars 10 and 12, with the short circuiting plates form one rotor circuit and bars 11 and 13 with the short-circuiting plates form another rotor circuit at right angles to the first. Let L denote the inductance of the stator winding and let R denote its resistance, both measured when the rotor circuits are absent. Let N denote the inductance of each rotor circuit and let S denote its resistance, both measured when the stator winding is absent. Inductance and resistance of the two windings, when considered in this manner, will be referred to as "true" inductance and "true" resistance. Let M denote the amplitude, or the maximum value, of the coefficient of mutual induction between the primary winding and any one of the secondary or rotor circuits. The magnetic flux distribution is supposed to be sinusoidal, that is to say, the co-efficient of mutual induction between primary and secondary circuits is of the form $M \cos \bar{\omega} t$, where $t$ is time in seconds, and $\bar{\omega}$ is the electrical angular velocity of the rotor.

Consider now a simple harmonic electromotive force $E \cos p t$ impressed upon the primary winding and the rotor rotating with angular velocity $\bar{\omega}$, then, denoting by $L_1$ and $R_1$ the effective inductance and the effective resistance, respectively, of the primary winding these quantities will be given by the following expressions:

$$L_1 = L - \frac{M^2}{2N}(\sin^2 v + \sin^2 w)$$
$$R_1 = R + \frac{pM^2}{4N}(\sin 2v + \sin 2w) \quad (1)$$

in which the angles $v$ and $w$ are given by $$\tan v = \frac{(p+\varpi)N}{S}, \quad \tan w = \frac{(p-\varpi)N}{S} \quad (2)$$

These formulæ have been deduced by me mathematically and demonstrated experimentally. They hold good, also, when the rotor has, instead of two circuits at right angles per pair of poles in the stator, any number of rotor circuits greater than two, say $2n$, provided, however, that they are uniformly distributed over the rotor circumference. It is to be understood that in this case the inductance N in the above formulæ for $L_1$ and $R_1$ is the true inductance of any one of these circuits and the resistance S is the true resistance of one circuit divided by $\frac{n}{2}$.

From the expression for $R_1$ it can be inferred that the speed range for negative $R_1$ is the narrower the larger the ratio $\frac{pN}{S}$ is, and the maximum value of $R_1$ becomes the greater the smaller R is and the greater $p$ is. In other words, in order to have a resistance curve in Figure 1 steep and high on each side of synchronism it is necessary to have plenty of copper in both the stator and the rotor circuits, and since in the resistance R and S is included also the effective resistance due to hysteresis and Foucault current losses, it is plain that having selected the frequency which is to be impressed upon the machines the iron cores must be sufficiently laminated and the magnetic flux density kept down as much as possible, as otherwise either no negative resistance or a too small one will be obtained. The rules to be observed in this respect are well known and they are employed, for instance, in the construction of inductance coils for loading telephonic transmission circuits.

The stator winding of a single phase induction motor having a negative resistance for an impressed electromotive force of a given frequency is employed in my invention for the purpose of modifying the effective resistance of any conductor in the same way as capacity reactance is employed for the purpose of modifying the inductance reactance of a conductor. But inasmuch as I believe myself to be the first to propose the employment of a reaction, which has all the characteristics of a negative resistance reaction, for the purpose of diminishing the effective resistance reaction of a conductor, I do not limit myself to any particular method of producing it and employing it for the purposes herein specified.

Squirrel cage rotors have been so far considered, but it is obvious from what is known in the art, that these can be replaced by rotors having coil windings which are symmetrically distributed over the rotor core.

The electrical reactions of each stator winding of a polyphase induction motor are similar to those of the primary winding of a single phase induction motor. Consider a two-phase induction motor with two rotor circuits at right angles.

Let L and R be the true inductance and the true resistance, respectively, of each primary phase winding and let N and S be the true inductance and the true resistance, respectively, of each rotor circuit. Let M be the amplitude of the mutual inductance between one primary phase winding and one secondary. Then the effective inductance $L_1$ and the effective resistance $R_1$ of each primary winding to an electromotive force $E \cos p t$ will be given by,—

$$L_1 = L - \frac{M^2}{N} \sin^2 w$$
$$R_1 = R + \frac{pM^2}{2N} \sin 2w \quad (3)$$

the angle $w$ being defined in the same way as above. If there are $2n$ rotor circuits, instead of two per pair of poles, each having a true inductance N and a true resistance S, then resistance S contained in angle $w$ must be replaced by $\frac{2S}{n}$. If there are $m$ primary phases instead of 2, then for each phase $$L_1 = \frac{m}{2}\left(L - \frac{M^2}{N}\sin^2 w\right)$$
$$R_1 = R + \frac{m}{2}\frac{pM^2}{2N}\sin 2w \quad (4)$$

The curves for $L_1$ and $R_1$ will be similar to those for the single phase induction motor given in Figure 1, but it is clear that they are much more symmetrical with respect to the vertical axis, which is not the case in single phase motors as is shown in Figure 1. It is obvious, also, that in a two-phase induction motor a much higher negative resistance is obtainable than in a single phase motor of similar construction.

When the primary winding of a single phase induction motor, developing a sufficiently large negative resistance, is inserted into a circuit, the resistance of this circuit may be diminished to any limit and by a suitable construction it may be arranged that this diminution will occur for a given frequency and for no other frequency which is appreciably different from it. The inductance reaction of the circuit being neutralized by suitable capacity reaction, the circuit is rendered highly resonant and selective, much more so than it is possible to obtain by ordinary means. The same thing is true of polyphase circuits in which case the primary phase windings of a polyphase induction motor developing a sufficiently large negative resistance must be inserted, one winding in each leg of the polyphase system.

The negative resistance of the primary winding of an induction motor may be transferred to a circuit magnified to any desirable extent by several methods, of which the following is an illustration. Referring to diagram of Figure 3, let 17, 18 be the terminals of the stator winding 19 of a single phase induction motor, developing negative resistance $R_1$ between 17 and 18. It is to be understood that the induction motor is not operated as a motor in the usual sense, but that its rotor is driven by any suitable means, such as another motor. Let the capacity of condenser 20 neutralize the effective inductance $L_1$ of this winding for the frequency under consideration. Insert between 17 and 18, a conductor 21 of resistance $R_2$ greater than $R_1$ and inductance zero, then the resulting resistance R between 17 and 18 will be:

$$R = \frac{R_1 R_2}{R_1 + R_2} \quad (5)$$

Since $R_1$ is negative, it follows that when $R_1 + R_2$ is positive and sufficiently small, R will be negative and as many times larger than $R_1$ as desirable. In this manner even a very large positive resistance of a conductor 17, 22, 23, 24, 18 may be diminished to any desirable limit, and the inductance of said conductor being neutralized by the capacity of a condenser 24 the conductor can be made highly resonant and selective to frequency speed $p$ and to no other frequency.

Not only does this conductor become highly resonant and selective in spite of its large true resistance, but the electro-motive force impressed upon the conductor by the alternator 23 is transformed to a much higher value in the stator winding 19. Let V be the amplitude of the electromotive force impressed upon conductor 17, 22, 23, 24, 18, its effective resistance being $r$, current in this conductor being $a$;

$$a = \frac{V}{r} = V_1\left(\frac{1}{R_1} + \frac{1}{R_2}\right) \quad (6)$$

where $V_1$ is the difference of potential between 17 and 18.

$$\frac{V}{V_1} = r\frac{(R_1 + R_2)}{R_1 R_2} = \frac{r}{R} \quad (7)$$

Where $r$ is made small and R large it is evident that $V_1$ is many times larger than V. This magnification of the feeble impressed electromotive force is of great value in telegraphy, particularly in wireless telegraphy, and deserves a brief elucidation here.

Referring to Figure 4, 25—26 is a wireless antenna grounded at 26 into which is inserted a resistance compensator 27, 28, of the type just described. 27 is the primary or stator winding developing a negative resistance $R_1$ and inductance $L_1$ which for the received frequency is neutralized by the capacity reaction of condenser 29. As shown, there is in parallel with 27, a conductor 30 of resistance $R_2$. There is, therefore, inserted into the antenna by the induction motor a resistance R which is given by:—

$$R = \frac{R_1 R_2}{R_1 + R_2}$$

Let $R_2 = 1000$ ohms
$R_1 = -900$ ohms

Hence $R = \frac{-1000 \times 900}{100} = -9000$ ohms

The antenna can, therefore, be loaded with 9100 ohms positive resistance and have an effective resistance of only $r = 100$ ohms for the frequency under consideration. Such an antenna is practically impenetrable to other frequencies and highly dissipative of the energy received from so-called atmospherics to which it would oppose at least 9100 ohms. It is admitted by all skilled in the art that the most important problem in wireless telegraphy is the problem of overcoming the interference of so-called "atmospherics" or "strays" with the reception of signals. They are electrical pulses, usually of short duration, communicating electromagnetic energy to the antenna which starts in it electrical oscillations of the natural frequencies. A sufficiently large amount of resistance introduced into the antenna so as to make it a highly inefficient receiving conductor for all frequencies of any importance in wireless telegraphy and particularly for the short electrical pulses produced by atmospherics would reduce greatly the amount of energy which such pulse could convey to the antenna and also greatly reduce that fractional part of this received energy which the antenna could convey to the translating devices of the receiving station. But this resistance would also weaken the effects of the waves which are intended to be received. The method herein described overcomes this difficulty by supplying negative resistance to reduce the high positive resistance of the antenna to any desirable low limit for the frequency to be received. It offers, therefore, a complete solution of the problems stated above, and it solves by a method which may be described very concisely as follows:

Make the antenna as inefficient as it can be made and then cure its defects selectively by the resistance compensator.

The transformations of the potential difference V impressed upon the antenna into the potential difference $V_1$ between 31, 32, will be, with inductance and capacity reaction of the antenna neutralized, $$V_1 = V\frac{R}{r} = V\frac{9000}{100} = 90V$$

Such a resonant rise of potential is practically impossible in ordinary tuning. Let the differences of potential between the terminals of 27 be $V_2$ then $$\frac{V_2}{V_1} = \sqrt{\frac{p^2 L_1^2 + R_1^2}{R_1^2}} \quad (8)$$

where $L_1$ is effective inductance and $R_1$ is the effective resistance of the stator winding 27. It will be found in practice that about $7R_1 = p \cdot L_1$; thence $$V_2 = 7.06 \; V_1 = 7.06 x 90V$$

That is to say, the local receiving condenser telephone 33 receives an electromotive force which is several hundred times that impressed upon the antenna.

There are obviously other methods of transferring to circuits in suitable amounts the negative resistance developed by an induction motor. Since the negative resistance is due to an electromotive force developed in the stator winding by the inductive action of the rotor currents, it is clear that this electromotive force is subject to all the well known methods of transformation by mutual induction or otherwise.

It is evident that the above described method of tuning provides excellent means of receiving selectively over the same conductor several frequencies simultaneously that is of carrying out the old idea of multiplex signalling by electrical tuning which has been suggested on many occasions, but which never met in practice with any substantial success. The old method of tuning by neutralizing inductance reaction against capacity reaction falls short in that it does not enable the local receiving circuit to utilize more energy than it receives from the sending station, whereas the method of tuning described here can supply several thousand times that energy and it derives it from the source of power at the receiving station.

Wireless telephony over long distance has been found impracticable up to the present time on account of the excessively small variations of the small amount of energy which reaches the antenna of the receiving station. The resistance compensator described here is capable of magnifying the received energy, and consequently its variations also, many thousands of times, and thus it will greatly extend the distances over which wireless telephony can be practiced by any of the methods now in vogue.

Having now described a particular method of constructing a resistance compensator and having shown how the negative resistance produced by a resistance compensator can be applied usefully in wave transmissions, I claim and desire to secure by Letters Patent the following:

I claim:

1. The method of increasing the selectivity of a receiver of radio-frequency electrical waves, which consists in associating therewith a receiving conductor having resistance sufficient to dissipate the greater part of the radio-frequency wave energy received, and exciting by received waves of selected radio-frequency a source of energy which by electromagnetic reaction transfers to said conductor a negative resistance reaction of high value as compared with the original resistance reaction of the conductor and of a frequency corresponding to the selected radio-frequency to be received.

2. The method of increasing the selectivity of a receiver of radio-frequency electrical waves which consists in associating therewith a receiving conductor having a resistance sufficient to dissipate the greater part of the radio frequency wave energy received and exciting with the received waves of selected radio frequency a source of electrical energy which, by inductive action, develops in said conductor a negative resistance reaction of like frequency and of high value as compared with the original resistance reaction of the conductor.

3. The method of screening a wireless receiving system against the action of disturbing electromagnetic waves which consists in diminishing the absorptive and increasing the dissipative power of its antenna for electromagnetic wave energy by associating with the antenna a resistance sufficiently high to screen the system effectively and impressing upon the antenna, when excited by waves of the predetermined frequency to be received, a negative resistance reaction sufficiently large to compensate to any desirable limit the losses due to the dissipative resistance introduced into the antenna.

4. An induction motor the primary winding of which under the action of a harmonically varying electromotive force reacts against it with a predetermined negative resistance reaction, a wireless antenna conveying this electromotive force to the motor, the antenna being loaded with a large resistance which will substantially diminish the absorptive power and increase the dissipative power of the antenna for electromagnetic wave energy impressed upon it, a connection of the antenna to the motor which will convey negative resistance reaction from the motor to the antenna and compensate to any desirable limit the losses in the antenna for waves of the frequency to be received, and suitable translating devices associated with the antenna.

5. An induction motor, the primary winding of which under the action of a harmonically varying electromotive force reacts against it with a negative resistance reaction, and a resistance shunt around the primary winding of said motor so adjusted that the resultant negative resistance of the shunt combination will be greater than the original negative resistance.

6. An electrical circuit containing a source of energy which under the action of a harmonically varying electromotive force reacts against it with a negative resistance reaction, in combination with a shunt circuit associated therewith and containing a resistance of such value that the resultant negative resistance reaction of the combined circuits will be greater than the original negative resistance reaction.

7. An electrical circuit containing a source of energy which under the action of a harmonically varying electromotive force reacts against it with a negative resistance reaction, in combination with a shunt circuit associated therewith and containing a resistance of such value that the resultant negative resistance reaction of the combined circuits will be greater than the original negative resistance reaction, the combined circuits having inductance and capacity so adjusted as to render the circuits resonant to harmonically varying electromotive forces of predetermined frequency.

8. A wireless receiving system having an antenna with which has been associated a resistance sufficiently large to screen the system effectively against disturbing electromagnetic waves impressed upon the antenna and means, excited by waves of predetermined frequency to be received, to impress upon the antenna a negative resistance reaction sufficiently large to compensate to any desirable limit the losses due to the dissipative resistance introduced into the antenna.

9. Means for amplifying electrical variations comprising a positive resistance and a negative resistance in parallel therewith, the two resistances being approximately equal to each other in value.

10. Means for amplifying electrical variations comprising a device having positive resistance characteristics and a negative resistance in parallel therewith, the two resistances being approximately equal to each other in value.

11. Means for amplifying electrical variations comprising a positive non-inductive resistance, a negative resistance, and means for supplying the variations to be amplified to the two resistances in parallel.

12. Means for amplifying electrical variations comprising a negative resistance having a working range over which the current flow therethrough varies inversely as the potential applied thereto, a positive resistance, and means for supplying the variations which are to be amplified to the two resistances in parallel, the combined resistance of the shunts being slightly less than the resistance of said means.

13. Means for amplifying electrical variations comprising a negative resistance, a positive resistance, and means for supplying electrical variations which are to be amplified to the two resistances in parallel, the two resistances being approximately equal to each other in value.

14. The method of amplifying electrical variations which consists in supplying variations which are to be amplified to a positive non-inductive resistance and a negative resistance in parallel, and thereby producing amplified electrical variations in the positive resistance.

15. Means for amplifying electrical variations comprising a circuit having two branches, one of said branches having a negative resistance, the other of said branches having a positive resistance and at least one of said branches having substantially zero reactance.

16. Means for amplifying electrical variations comprising a circuit having two branches, one of said branches having a negative resistance, the other of said branches having a positive resistance and each of said branches having substantially zero reactance.

17. Means for amplifying electrical variations comprising a supply circuit, a pair of branches in series with said supply circuit, one of said branches having a negative resistance and the other of said branches having a positive resistance, and an indicating device, distinct from said resistances, in one of said branches.

18. In combination, a source of signaling energy, a circuit energized thereby, said circuit having a branched portion, and a series portion, the combined resistance of the branched portion being negative and approximately equal to the resistance of the series portion, whereby the resistance of the series portion is approximately counteracted and the current in said series portion in response to said signaling energy is increased.

19. Means for amplifying radio-frequency electrical variations, comprising a positive resistance, a negative resistance, and means for supplying the radio-frequency variations to be amplified to the two resistances in parallel.

20. In combination, means for amplifying electrical variations and a translating device actuated by said amplified electrical variations, said amplifying means comprising a positive resistance, a negative resistance, and means for supplying the variations to be amplified to the two resistances in parallel.

21. Means for amplifying electrical variations, comprising a positive resistance, a negative resistance possessing reactance, and means for supplying the variations to be amplified to the two resistances in parallel, the branch of said parallel resistances containing the negative resistance having also means for compensating for the said reactance at the frequency of the said variations.

In testimony whereof I affix my signature.

MICHAEL I. PUPIN.